(12) United States Patent
Hong et al.

(10) Patent No.: US 8,319,913 B2
(45) Date of Patent: Nov. 27, 2012

(54) RESIN-TYPE LIGHTGUIDE PLATE COMPOSITION, BACKLIGHT UNIT INCLUDING LIGHTGUIDE PLATE FORMED USING THE COMPOSITION, AND LIQUID CRYSTAL DISPLAY INCLUDING THE BACKLIGHT UNIT

(75) Inventors: Sueng Mo Hong, Gyeonggi-do (KR); Kee Yong Kim, Gyeonggi-do (KR); Tae Wook Kim, Seoul (KR)

(73) Assignee: Dongwoo Fine-Chem Co., Ltd. (KR)

( * ) Notice: Subject to any disclaimer, the term of this patent is extended or adjusted under 35 U.S.C. 154(b) by 61 days.

(21) Appl. No.: 13/091,463

(22) Filed: Apr. 21, 2011

(65) Prior Publication Data

US 2011/0261288 A1 Oct. 27, 2011

(30) Foreign Application Priority Data

Apr. 23, 2010 (KR) .................. 10-2010-0038023

(51) Int. Cl.
- *G02F 1/1335* (2006.01)
- *G02F 1/13* (2006.01)
- *G09F 13/04* (2006.01)
- *F21V 7/04* (2006.01)

(52) U.S. Cl. .......... 349/62; 349/187; 362/97.2; 362/629

(58) Field of Classification Search .............. 349/61–65, 349/187; 438/30; 362/97.1–97.4
See application file for complete search history.

(56) References Cited

U.S. PATENT DOCUMENTS

| | | | |
|---|---|---|---|
| 5,616,630 A | 4/1997 | Heinze | |
| 2006/0077322 A1* | 4/2006 | Chuang et al. | 349/113 |
| 2008/0119583 A1* | 5/2008 | Jones et al. | 522/113 |
| 2009/0279321 A1* | 11/2009 | Marttila et al. | 362/551 |
| 2010/0085735 A1* | 4/2010 | Kim et al. | 362/97.2 |
| 2010/0240840 A1 | 9/2010 | Toyama et al. | |
| 2011/0108191 A1 | 5/2011 | Sanai et al. | |

FOREIGN PATENT DOCUMENTS

| | | |
|---|---|---|
| JP | 1998-095640 A | 4/1998 |
| JP | 2003-183345 | 7/2003 |

(Continued)

OTHER PUBLICATIONS

Office Action dated Apr. 24, 2012 issued by the JPO for a corresponding Japanese Patent Application No. 2011-095321.

*Primary Examiner* — Brian M. Healy
*Assistant Examiner* — Paul Lee
(74) *Attorney, Agent, or Firm* — Workman Nydegger

(57) ABSTRACT

A resin-type light guide plate composition, a backlight unit including the light guide plate formed using the composition and a liquid crystal display including the backlight unit. The resin-type light guide plate composition includes urethane-(meth)acrylate oligomer prepared by reacting a reaction product of a compound prepared by reacting divalent polyol and divalent isocyanate with (meth)acrylate monomer including hydroxyl group, hydrogen bond type (meth)acrylate including hydroxyl group or carboxyl group, acrylic monomer having a maximum shrinkage rate of 15% or less, represented by the equation (1):

Maximum shrinkage rate (%)=−2.58+3000*[number of (meth)acryl functional groups/molecular weight of acrylic monomer], and a photoinitiator.    <Equation 1>

The composition can be used for a light guide plate formed by a simple curing process and having excellent adhesion with respect to a base film and adopted to an edge-lit, local dimming backlight unit having a reduced shrinkage rate.

16 Claims, 5 Drawing Sheets

FOREIGN PATENT DOCUMENTS

| | | |
|---|---|---|
| JP | 2006-219598 | 8/2006 |
| JP | 2007-238819 | 9/2007 |
| JP | 2011-184588 | 9/2011 |
| KR | 100600254 B1 | 7/2001 |
| WO | 2007/145246 | 12/2007 |
| WO | 2010/001855 | 1/2010 |

* cited by examiner

RESIN-TYPE LIGHTGUIDE PLATE COMPOSITION, BACKLIGHT UNIT INCLUDING LIGHTGUIDE PLATE FORMED USING THE COMPOSITION, AND LIQUID CRYSTAL DISPLAY INCLUDING THE BACKLIGHT UNIT

CROSS-REFERENCE TO RELATED APPLICATION

This application claims priority to and the benefit of Korean Patent Application No. 10-2010-0038023 filed on Apr. 23, 2010, the entire content of which is incorporated herein by reference.

BACKGROUND OF THE INVENTION

1. Field of the Invention

The present invention relates to a resin-type light guide plate composition, a backlight unit including the light guide plate formed using the composition, and a liquid crystal display including the backlight unit. More particularly, the present invention relates to a resin-type light guide plate composition, which can fabricate a light guide plate useful for a module-type backlight unit exhibiting excellent adhesion to a base film and enabling local dimming while having a low shrinkage rate, by a simple curing process and can form a thick film, a backlight unit including the light guide plate formed using the composition, and a liquid crystal display including the backlight unit.

2. Description of the Related Art

Liquid crystal displays are used in a wide range of applications, including notebook type computer, monitors, televisions, or outdoor electronic displays, because they have various advantages of a slim size, a lightweight design, low electric power consumption, and so on.

The liquid crystal display includes a liquid crystal panel and a backlight unit. The backlight unit supplies the liquid crystal panel with light, which is transmitted through the liquid crystal panel. Here, the liquid crystal panel adjusts the transmittance of light to display an image. Backlight units are classified into edge-type backlight units and direct-type backlight units depending on the arrangement of light sources.

In an edge-type backlight unit, a light source is arranged at either lateral side of a liquid crystal panel and a light guide plate is arranged in rear of the liquid crystal panel, so that light incident from the lateral side of the liquid crystal panel is guided to the rear side of the liquid crystal panel.

In a direct-type backlight unit, a plurality of light sources are provided on a rear surface of the liquid crystal panel, and light emitted from the plurality of light sources is directly supplied to the rear surface of the liquid crystal panel.

Examples of light sources for LCD include electroluminescence (EL) lamps, cold cathode fluorescent lamps (CCFLs), hot cathode fluorescent lamp (HCFLs), and light-emitting diodes (LEDs). Among the light sources, the LEDs are increasingly used owing to their advantages including low power consumption and high emission efficiency.

Figure 1:
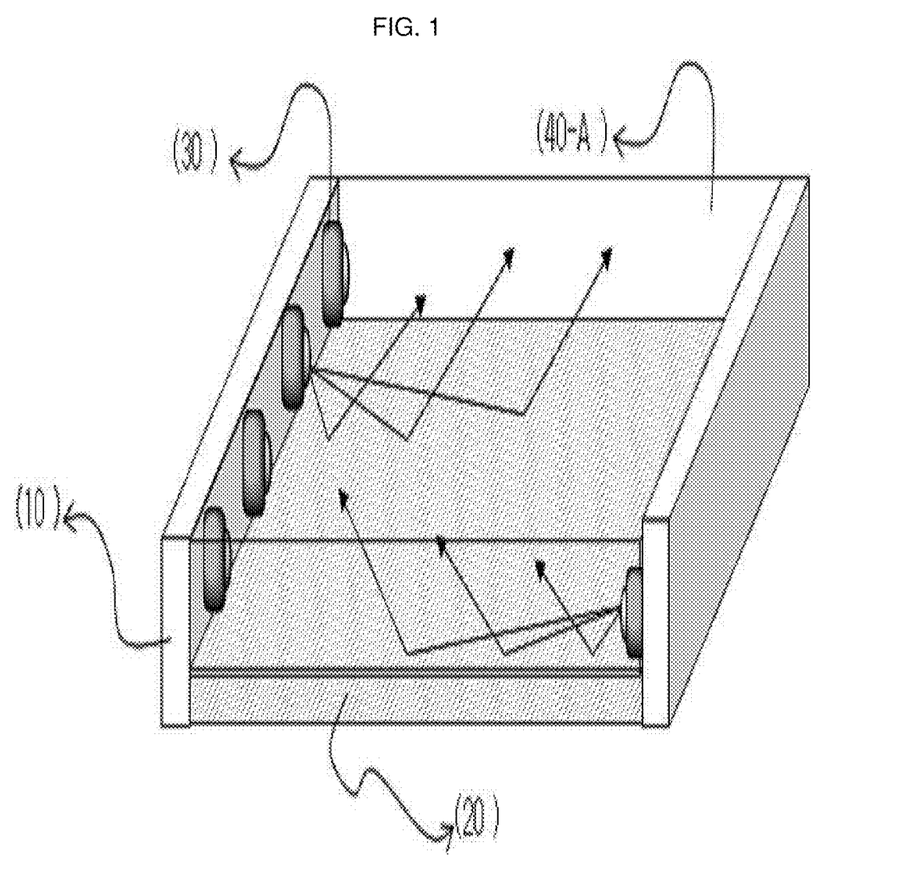
FIG. 1 is a schematic configuration view that illustrates an edge-type LED backlight unit.

FIG. 1 is a schematic configuration view that illustrates an edge-type LED backlight unit.

In a case of an edge-type LED backlight unit, a plurality of LEDs 30 are mounted on a printed circuit board 10 and fixed on a lateral side of a light guide plate 40-A. The light guide plate 40-A allows light that is incident from the plurality of LEDs 30 to be evenly spread over a wide area of the light guide plate 40-A due to total reflection occurring a repeated number of times while traveling the light guide plate 40-A, thereby providing a surface light source to a liquid crystal panel. A reflection plate 20, which is positioned on a rear surface of the light guide plate 40-A, reflects the light having passed the rear surface of the light guide plate 40-A toward the liquid crystal panel, thereby improving brightness of light. However, the edge-type LED configuration is disadvantageous in that local dimming is not enabled, that is, unnecessary lamps cannot be turned off.

Figure 2:
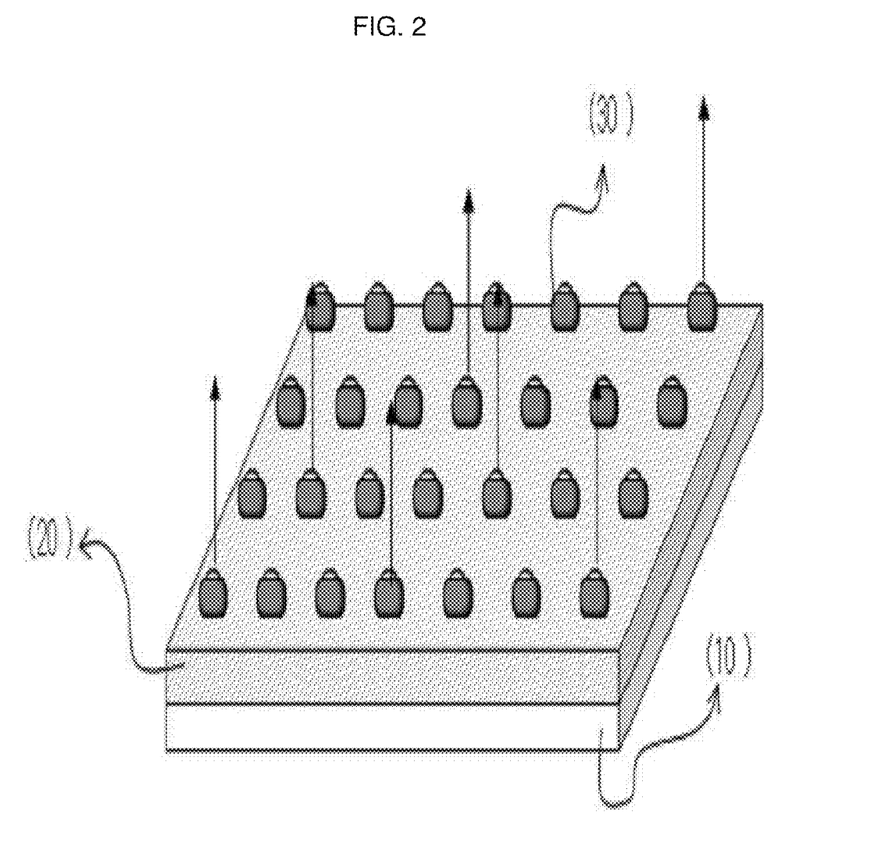
FIG. 2 is a schematic configuration view that illustrates a direct-type LED backlight unit.

By contrast, In a case of a direct-type LED backlight unit, as shown in FIG. 2, a plurality of LEDs 30 are disposed in front of a printed circuit board 10 and a reflection plate 20, so that the LEDs are partially turned on/off, thereby enabling local dimming. In this case, however, the number of LEDs 30 may increase when it is intended to ensure brightness uniformity, making it difficult to effectuate a power consumption reducing effect of local dimming.

Figure 3:
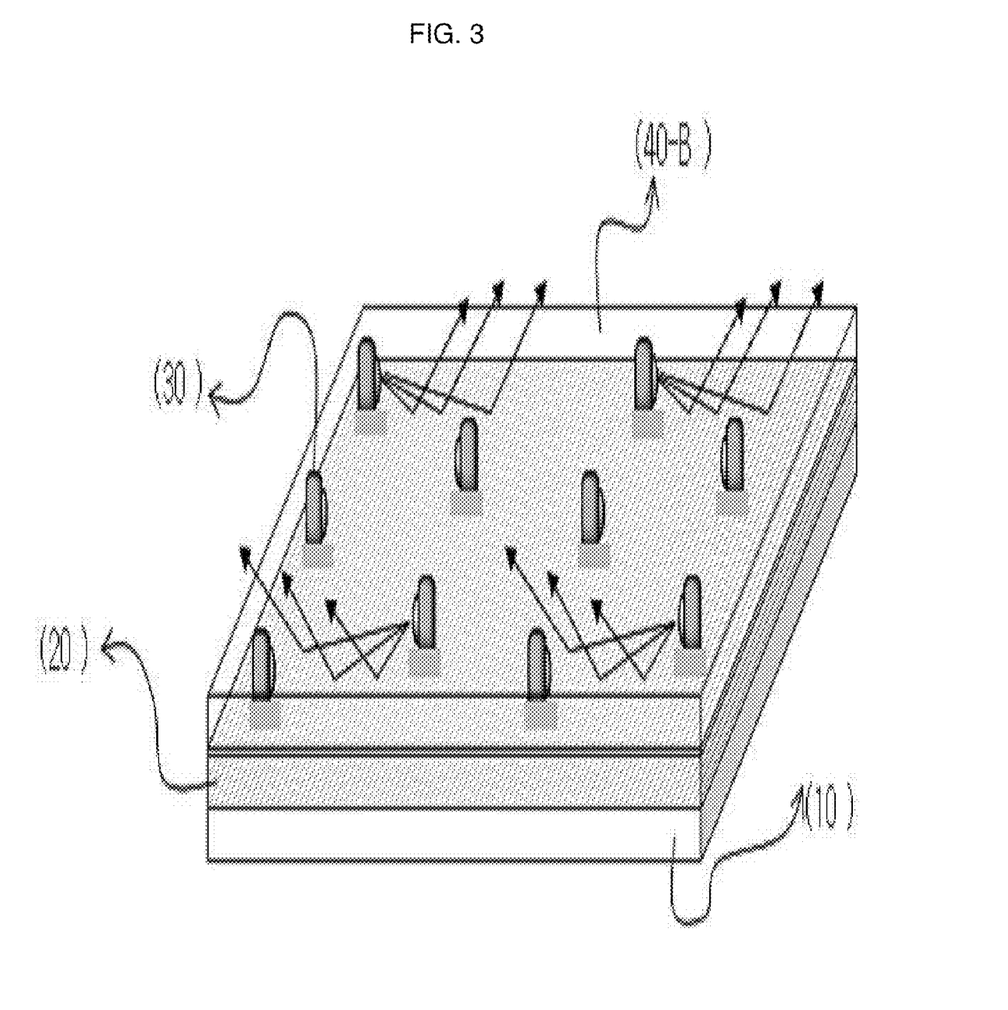
FIG. 3 is a schematic configuration view that illustrates a module-type LED backlight unit, which is a combination type of edge- and direct-types.

To solve the problems, there has been proposed a local dimming enabling module-type LED backlight unit, as shown in FIG. 3.

While the backlight unit shown in FIG. 3 is of an edge type, it is configured such that a plurality of LEDs 30 are disposed at regular intervals in front of a printed circuit board 10 and a reflection plate 20, like a direct-type backlight unit, thereby implementing a local dimming effect while reducing the number of LEDs 30. However, in order to evenly disperse light generated from the LEDs 30 to a lateral side, a light guide plate is required. However, the light guide plate cannot be mounted in front of the printed circuit board.

SUMMARY OF THE INVENTION

Embodiments of the present invention provide a resin-type light guide plate composition, which can fabricate a light guide plate useful for a module-type backlight unit exhibiting excellent adhesion to a base film and enabling local dimming while having a low shrinkage rate, by a simple curing process and can form a thick film, a backlight unit including the light guide plate formed using the composition, and a liquid crystal display including the backlight unit.

According to an embodiment of the present invention, a resin-type light guide plate composition is provided, including: urethane-(meth)acrylate oligomer prepared by reacting a reaction product of a compound prepared by reacting divalent polyol and divalent isocyanate with (meth)acrylate monomer including hydroxyl group; hydrogen bond type (meth)acrylate including hydroxyl group or carboxyl group; acrylic monomer having a maximum shrinkage rate of 15% or less, represented by the equation (1):

Maximum shrinkage rate (%)=−2.58+3000*[number of (meth)acryl functional groups/molecular weight of acrylic monomer]; and a photoinitiator. <Equation 1>

The urethane-(meth)acrylate oligomer may have a number average molecular weight ranging from 2,000 to 5,000.

The hydrogen bond type (meth)acrylate may be represented by the formula 2 or 3:

<Formula 2> wherein $R_1$ independently represents alkyl or heteroalkyl having 1 to 10 carbon atoms, cycloalkyl having 3 to 8 carbon atoms, phenyl, alkylphenyl having 1 to 10 carbon atoms, or phosphorus, $R_2$ represents hydroxyl or carboxyl, and $R_3$ represents hydrogen or methyl.

The hydrogen bond type (meth)acrylate may be acid-denatured (meth)acrylate oligomer prepared by reacting acid anhydride with (meth)acrylate monomer containing hydroxyl group.

The acid-denatured (meth)acrylate oligomer may be represented by the formula 4:

wherein $R_1$ independently represents hydrogen or methyl; $R_2$ independently represents n is an integer of 1 to 10;
$R_3$ independently represents a radical selected from the group consisting of hydrogen, saturated or unsaturated alkyl having 1 to 10 carbon atoms, heteroalkyl, benzyl, carboxyl group, hydroxyl group, and halogen atom; and
$R_4$ independently represents a radical selected from the group consisting of selected from saturated or unsaturated alkyl having 1 to 10 carbon atoms.

The urethane-(meth)acrylate oligomer may be contained in the composition in an amount of 10 to 70 wt % based on the total weight of the composition.

The hydrogen bond type (meth)acrylate may be contained in the composition in an amount of 10 to 40 wt % based on the total weight of the composition.

The acrylic monomer may be contained in an amount of 10 to 60 wt % based on the total weight of the composition.

The resin-type light guide plate composition may further include a tri- or higher-functional (meth)acrylate hardener having a maximum shrinkage rate of 20% or higher.

The composition may include two or more kinds of the acrylic monomer and the maximum shrinkage rate calculated by the equation (2) may be in a range of 3 to 7%:

$$\text{Maximum shrinkage rate (\%)} = \Sigma_{n=1}^{i} XnSn \qquad \text{<Equation 2>}$$

wherein i is the number of kinds of the acrylic monomer contained in the composition, assuming that each acrylic monomer is referred to as an nth monomer irrespective of the order thereof contained in the composition, XnSn means the product of Xn and Sn, wherein Xn denotes a mass fraction of the nth monomer, and Sn is a maximum shrinkage rate of the nth monomer, which is calculated by the equation (1).

The composition may further include an UV stabilizer or a thermal stabilizer.

According to another embodiment of the present invention, a backlight unit is provided, including a light emitting diode, and a light guide plate formed on a reflection plate using the composition of the present invention to cover the light emitting diode.

The light guide plate may have a thickness of 0.2 to 2 mm.

According to another embodiment of the present invention, a liquid crystal display is provided, including the backlight unit.

As described above, the composition of the present invention can form a thick film of 1 mm or greater, thereby forming a light guide plate converting a point light source into a surface light source by a simple curing process by coating the composition irrespective of the positions of LEDs.

In addition, the composition of the present invention can be used for forming a light guide plate in a module type backlight unit of a combination of edge and direct types, enabling local dimming.

Further, the composition of the present invention can reduce curing shrinkage while having excellent adhesion and demonstrating little change in the color coordinates.

Additional aspects and/or advantages of the invention will be set forth in part in the description which follows and, in part, will be obvious from the description, or may be learned by practice of the invention.

BRIEF DESCRIPTION OF THE DRAWINGS

The objects, features and advantages of the present invention will be more apparent from the following detailed description in conjunction with the accompanying drawings, in which.

DETAILED DESCRIPTION OF THE INVENTION

Hereinafter, the present invention will be described in detail such that it can be easily practiced by one skilled in the art.

The present invention provides a resin-type light guide plate composition including urethane-(meth)acrylate oligomer; hydrogen bond type (meth)acrylate; acrylic monomer; and a photoinitiator.

Since the composition of the present invention can form a thick film of 1 mm or greater and can reduce curing shrinkage while having excellent adhesion, a light guide plate covering LEDs in a module type backlight unit of a combination of edge and direct types enabling local dimming can be fabricated.

The urethane-(meth)acrylate oligomer can control a shrinkage rate and has excellent transparency and mechanical properties.

The urethane-(meth)acrylate oligomer may be prepared by allowing a compound to react with (meth)acrylate monomer containing hydroxyl group, the compound prepared by reacting divalent polyol with divalent isocyanate. That is to say, a compound having a terminal isocyanate group is prepared by reacting divalent polyol with excess divalent isocyanate, and the compound is reacted with (meth)acrylate monomer containing hydroxyl group. The divalent polyol preferably has a number average molecular weight ranging from 1,500 or greater. Specifically, non-limiting examples of the divalent polyol may be selected, alone or in combination, from the group consisting of polyester polyol, polycaprolactone denatured polyol, polycarbonate polyol, polybutadiene polyol, polyisophorene polyol, polyethyleneglycol, polypropyleneglycol, polyethylene-propyleneglycol and polytetramethylglycol. Specifically, non-limiting examples of the divalent isocyanate may be selected, alone or in combination, from the group consisting of toluene-2,4-diisocyanate, xylene diisocyanate, isophorone diisocyanate, tetramethylxylene diisocyanate, lysine diisocyanate, trimethylhexamethylene diisocyanate, 2,2-bis-isocyanatopropane, 6-isopropyl-1,3-phenyldiisocyanate, bis(2-isocyanateethyl)-fumarate, 1,6-hexanediisocyanate, 4,4'-biphenylene diisocyanate, 3,3'-dimethylphenylene diisocyanate, 3,3'-dimethyl-4,4'-diphenylmethane diisocyanate, p-phenylene diisocyanate, m-phenylene diisocyanate, 1,5-naphthalene diisocyanate, 1,4-xylene diisocyanate and 1,3-xylene diisocyanate. Preferably, the divalent isocyanate may be selected, alone or in combination, from the group consisting of 2,4-toluenediisocyanate and isomers thereof, isophoronediisocyanate, 1,5-naphthalene diisocyanate, 1,4-xylenediisocyanate, 1,3-xylenediisocyanate, 4,4-dicyclohexylmethane diisocyanate, and 1,6-hexamethylenediisocyanate. Specifically, non-limiting examples of the acrylate monomer containing hydroxyl group may be selected, alone or in combination, from the group consisting of 2-hydroxyethyl (meth)acrylate, 2-hydroxypropyl (meth)acrylate, 4-hydroxybutyl (meth)acrylate, caprolactone-denatured (meth)acrylate, polyethyleneglycol mono(meth)acrylate and polypropyleneglycol mono(meth)acrylate.

In the process of preparing the urethane-(meth)acrylate oligomer, in order to improve reactivity in a catalyst may be used. In order to improve reaction stability and storage stability, a polymerization inhibitor may be used. Specific examples of the catalyst may be at least one selected, alone or in combination, from the group consisting of tertiary amines including triethylamine, triethanolamine, 1,4-diazabiscyclo-(2,2,2)-octane, N,N-diethylcyclohexylamine, N-methylmorpholine, and N,N,N',N'-tetramethyl-methanediamine, or tin-based catalysts including dibutyl tin dilaurate, dibutyl tin dibutoxide, di-(2-ethylhexyl) tin oxide, dibutyl tin diisooctylmaleate, dibutyl tin bis-(acetylacetonate), butyl tin trichloride, and tributyl tin cyanate. Preferably, dibutyl tin dilaurate is used as the catalyst. A small amount of a phenol-type polymerization inhibitor, including methoxy hydroquinone, hydroquinone, and t-butyl hydroquinone may be used as the polymerization inhibitor.

The urethane-(meth)acrylate oligomer may be represented by the formula (1);

<Formula 1> wherein $R_1$ represents a structure excluding a terminal hydroxyl group from divalent polyol, $R_2$ represents a structure excluding a terminal isocyanate group from the divalent isocyanate, $R_3$ represents n is an integer of 1 to 10, and $R_4$ represents hydrogen or methyl.

The urethane-(meth)acrylate oligomer may have a number average molecular weight ranging from 2,000 to 5,000. If the number average molecular weight is smaller than 2,000, the curing shrinkage rate may increase. If the number average molecular weight is greater than 5,000, the composition may have increased viscosity, thereby lowering workability.

The urethane-(meth)acrylate oligomer may be contained in the composition in an amount of 10 to 70 wt % based on the total weight of the composition. Preferably, the urethane-(meth)acrylate oligomer may be contained in an amount of 20 to 60 wt %. If the urethane-(meth)acrylate oligomer is contained in the composition in an amount of less than 10 wt %, a mechanical property of an adhesive agent after curing may be lowered. If the urethane-(meth)acrylate oligomer is contained in the composition in an amount of greater than 70 wt %, adhesion of the composition may be lowered and the viscosity thereof may increase, thereby lowering workability.

The hydrogen bond type (meth)acrylate may form an ionic bond with a base film or a physical bond with the base film by melting part of the base film, thereby imparting adhesion to the composition.

The hydrogen bond type (meth)acrylate may include, not limited to, (meth)acrylates as long as they are capable of forming hydrogen bonds. Preferably, (meth)acrylate including hydroxyl group or carboxyl group may be used.

The hydrogen bond type (meth)acrylate is preferably represented by the formula 2 or 3:

<Formula 2>

<Formula 3> wherein $R_1$ independently represents alkyl or heteroalkyl having 1 to 10 carbon atoms, cycloalkyl having 3 to 8 carbon atoms, phenyl, alkylphenyl having 1 to 10 carbon atoms, or phosphorus, $R_2$ represents hydroxyl or carboxyl, and $R_3$ represents hydrogen or methyl.

Among the hydrogen bond type (meth)acrylate represented by the Formula 2, specific examples of the (meth)acrylate containing hydroxyl group may include 2-hydroxyethyl (meth)acrylate, 2-hydroxypropyl (meth)acrylate, 4-hydroxybutyl (meth)acrylate, caprolactone-denatured (meth)acrylate, polyethyleneglycol mono(meth)acrylate, polypropyleneglycol mono(meth)acrylate, and phosphoric acid (meth)acrylate, and specific examples of the (meth)acrylate containing carboxyl group may include (meth)acrylic acid and (meth)acrylic acid dimer.

The hydrogen bond type (meth)acrylate may be acid-denatured (meth)acrylate oligomer prepared by reacting acid anhydride with (meth)acrylate monomer containing hydroxyl group in the presence of a catalyst. The acid anhydride is preferably cyclic acid anhydride. Specifically, non-limiting examples of the (meth)acrylate monomer containing the hydroxyl group may be selected, alone or in combination, from the group consisting of 2-hydroxyethyl(meth)acrylate, 2-hydroxypropyl (meth)acrylate, 4-hydroxybutyl (meth)acrylate, caprolactone-denatured (meth)acrylate, polyethyleneglycol mono(meth)acrylate and polypropyleneglycol mono(meth)acrylate.

The acid-denatured (meth)acrylate oligomer may be represented by the formula 4:

<Formula 4> wherein $R_1$ independently represents hydrogen or methyl; $R_2$ independently represents n is an integer of 1 to 10;

R₃ independently represents a radical selected from the group consisting of hydrogen, saturated or unsaturated alkyl having 1 to 10 carbon atoms, heteroalkyl, benzyl, carboxyl group, hydroxyl group, and halogen atom; and R₄ independently represents a radical selected from the group consisting of selected from saturated or unsaturated alkyl having 1 to 10 carbon atoms.

The hydrogen bond type (meth)acrylate represented by the Formula 3 may be prepared by reacting a monomer having an epoxy functional group with (meth)acrylic acid. A monofunctional group is preferred as the epoxy functional group. However, if the monomer has a large molecular weight, multifunctional group may also be used. Specifically, non-limiting examples of the monomer having an epoxy functional group may include ethyl glycidyl ether, propyl glycidyl ether, butyl glycidyl ether, polyethyleneglycol diglycidyl ether, polypropyleneglycol diglycidyl ether, phenol glycidyl ether, nonylphenol glycidyl ether, polybisphenol A diglycidyl ether, polybisphenol F diglycidyl ether, polybisphenolS diglycidyl ether, and polybisphenol AD diglycidyl ether. During the reaction between the monomer having an epoxy functional group and (meth)acrylic acid, a catalyst may be used. Examples of the catalyst may include tertiary amines, quarternary ammoniums, inorganic alkali salts, phosphorus-based catalysts. Specifically, non-limiting examples of the catalyst may include triethylamine, pyridine, trimethylamine, tributylamine, triethylamine benzylchloride, triethylamine benzylbromide, tributylamine benzylchloride, tributylamine benzylbromide, tetrabutylamine chloride, tetrabutylamine bromide, triphenylphosphine, and chrome octate.

A compound represented by the formulas 2 to 4 may be used as the hydrogen bond type (meth)acrylate alone or in combination. The hydrogen bond type (meth)acrylate may be contained in an amount of 10 to 40 wt % based on the weight of the composition, preferably in an amount of 15 to 35 wt %. If the hydrogen bond type (meth)acrylate is contained in an amount of less than 10 wt %, sufficiently high adhesion may not be achieved. If the hydrogen bond type (meth)acrylate is contained in an amount of greater than 40 wt %, compatibility of the composition may be lowered.

The acrylic monomer reduce the viscosity of the composition for improving workability while not adversely affecting physical properties of the composition.

The acrylic monomer may have a maximum shrinkage rate of 15% or less, represented by the equation (1):

Maximum shrinkage rate (%)=−2.58+3000*[number of (meth)acryl functional groups/molecular weight of acrylic monomer]. <Equation 1>

Preferably, the acrylic monomer may have a maximum shrinkage rate ranging from 3 to 10%. If the maximum shrinkage rate of the acrylic monomer is less than 3%, the reactivity is too low to increase the curing degree. However, if the maximum shrinkage rate of the acrylic monomer is greater than 10%, the curing degree is low so that an appropriate physical property cannot be achieved although the curing speed is high.

The maximum shrinkage rate represented in the equation (1) is based on the assumption that the curing degree is 100%. The shrinkage rate can be generally represented by a ratio of pre-curing specific gravity to post-curing specific gravity, as given in the following equation (A):

Shrinkage rate (%)={(Pre-curing specific gravity−Post-curing specific gravity)/(Pre-curing specific gravity)}×100. <Equation A>

Alternatively, the shrinkage rate can be simply calculated using the equation (1), and the product of the maximum shrinkage rate represented in the equation (1) and the curing degree is equal to the shrinkage rate represented in the equation (A).

Specific examples of the acrylic monomer having the maximum shrinkage rate of not greater than 15% may include 2-phenoxyethylacrylate (13%), cyclictrimethylol propane formalacrylate (12.4%), tridecylacrylate (9.2%), octyldecylacrylate (12.6%), isobonylacrylate (11.8%), 2-(2-ethoxyethoxy)acrylate (13.4%), isodecylacrylate (11.6%), caprolactoneacrylate (6.1%), laurylacrylate (9.9%), stearic acrylate (6.7%), methoxypolyethyleneglycol 600 monoacrylate (2.1%), nonylphenolethylene oxide (4 mol) acrylate (4.1%), nonylphenolethylene oxide (8 mol) acrylate (2.2%), methoxypolyethyleneglycol 600 monoacrylate (1.8%), isodecylmethacrylate (10.7%), stearicmethacrylate (6.3%), 2-phenoxyethylmethacrylate (12%), isobonylmethacrylate (11%), and tridecylmethacrylate (8.6%).

The acrylic monomer may be contained in an amount of 10 to 60 wt % based on the weight of the composition. Preferably, the acrylic monomer is contained in an amount of 20 to 50 wt % based on the weight of the composition. If the acrylic monomer is contained in an amount of less than 10 wt %, the viscosity of the composition may increase, thereby lowering coating processibility and deteriorating external appearance. If the acrylic monomer is contained in an amount of greater than 60 wt %, a mechanical property may be reduced, thereby lowering adhesion.

The photoinitiator changes a liquid type resin into a solid type resin by light irradiation.

The photoinitiator can be classified into a Type 1 initiator that produces free radicals by molecular decomposition due to a difference in the chemical structure or molecular bonding energy, and a Type 2 initiator that is a hydrogen abstraction type initiator in cooperation with tertiary amine. Specific examples of the Type 1 initiator may include acetophenones such as 4-phenoxydichloroacetophenone, 4-t-butyldichloroacetophenone, 4-t-butyltrichloroacetophenone, diethoxyacetophenone, 2-hydroxy-2-methyl-1-phenylpropane-1-one, 1-(4-isopropylphenyl)-2-hydroxy-2-methylpropane-1-one, 1-(4-dodecylphenyl)-2-hydroxy-2-methylpropane-1-one, 4-(2-hydroxyethoxy)-phenyl(2-hydroxy-2-propyl)ketone, or 1-hydroxycyclohexylphenylketone; benzoins such as benzoin, benzoinmethylether, benzomethylether, benzyldimethylketal; acyiphosphine oxides; and titanocene compounds. Specific examples of the Type 2 initiator may include benzophenones such as benzophenone, benzoylbenzoic acid, benzoylbenzoic acid methylether, 4-phenylbenzophenone, hydroxybenzophenone, 4-benzol-4'-methyldiphenylsulfide, 3,3'-methyl-4-methoxybenzophenone; and tioxantones such as tioxantone, 2-chlorotioxantone, 2-methyltioxantone, 2,4-dimethyltioxantone, or isopropyltioxantone. The photoinitiator may be used alone or in combination of these compounds. In addition, a Type 1 initiator and a Type 2 initiator may be used in combination.

The photoinitiator may be contained in an amount of 0.1 to 10 wt % based on the weight of the composition. Preferably, the photoinitiator is contained in an amount of 0.2 to 3 wt % based on the weight of the composition. If the photoinitiator is contained in the composition in an amount of less than 0.2 wt %, curing may not be sufficiently performed, thereby lowering a mechanical property and adhesion. If the photoinitiator is contained in the composition in an amount of greater than 3 wt %, poor adhesion or brittleness may be resulted due to curing shrinkage.

In order to improve curing efficiency, the resin-type light guide plate composition according to the present invention may further include a tri- or higher-functional (meth)acrylate hardener.

The tri- or higher-functional (meth)acrylate hardener may have the maximum shrinkage rate of 20% or greater, represented in the formula (1). Specific examples of the tri- or higher-functional (meth)acrylate hardener may include glycerol propyl added tri(meth)acrylate, ditrimethylol tetra(meth)acrylate, dipentaerythritol penta(meth)acrylate, pentaerythritol tri(meth)acrylateurethane oligomer reacting with diisocyanate, and dipenta(meth)acrylate urethane oligomer reacting with diisocyanate.

The tri- or higher-functional (meth)acrylate hardener may be contained in an amount of 1 to 5 wt % based on the weight of the composition. If the tri- or higher-functional (meth)acrylate hardener is contained in an amount of less than 1 wt %, the curing efficiency may become poor. If the tri- or higher-functional (meth)acrylate hardener is contained in an amount of greater than 5 wt %, shrinkage becomes severe so that adhesion may be lowered, resulting in curling and mechanical damages.

The resin-type light guide plate composition according to the present invention may further include an UV stabilizer and a thermal stabilizer when necessary.

The UV stabilizer blocks or absorbs UV rays in order to prevent decomposition of the hardened composition by continuous UV exposure to the hardened composition.

The UV stabilizer may be classified into an absorbent, a quencher, and a hindered amine light stabilizer (HALS) according to the reaction mechanism. In addition, the UV stabilizer may also be classified into phenyl salicylate (absorbent), benzophenone (absorbent), benzotriazole (absorbent), nickel derivatives (quencher), and a radical scavenger. In the present invention, any UV stabilizer can be used without restriction unless it considerably changes an initial color of the composition.

Polyphenols, phosphites, and lactones, which can be commercially available, may be used as the thermal stabilizer. The UV stabilizer and the thermal stabilizer can be used by appropriately adjusting amounts thereof while not affecting curing efficiency.

In addition to the UV stabilizer or the thermal stabilizer, the resin-type light guide plate composition according to the present invention may further include additives that are generally used in the related art unless the scope of the present invention is not impaired.

The resin-type light guide plate composition according to the present invention may include two or more kinds of acrylic monomers. In this case, the maximum shrinkage rate calculated by the equation (2) may be in a range of 3 to 7%:

$$\text{Maximum shrinkage rate (\%)} = \Sigma_{n=1}^{i} XnSn \qquad \text{<Equation 2>}$$

wherein i is the number of kinds of the acrylic monomer contained in the composition, assuming that each acrylic monomer is referred to as an nth monomer irrespective of the order thereof contained in the composition, XnSn means the product of Xn and Sn, wherein Xn denotes a mass fraction of the nth monomer, and Sn is a maximum shrinkage rate of the nth monomer, which is calculated by the equation (1).

If the maximum shrinkage rate increases, the adhesion is reduced and the curing is facilitated. If the maximum shrinkage rate decreases, the adhesion is enhanced and the curing is moderated. The curing degree based on UV irradiation has the same propensity as the shrinkage rate. That is to say, the composition having the maximum shrinkage rate of less than 7% demonstrates the curing degree of greater than 90%. Accordingly, curling due to post-curing may be avoided during various tests carried out at high temperatures.

The present invention also provides a backlight unit including LEDs, and a light guide plate formed on a reflection plate using the composition according to the present invention to cover the LEDs.

FIG. 3 is a schematic configuration view that illustrates a local dimming enabling, module-type LED backlight unit, which is a combination type of edge- and direct-types.

Referring to FIG. 3, the backlight unit according to the present invention includes a printed circuit board 10, a reflection plate 20, LEDs 30, and a light guide plate 40-B. Although not shown in FIG. 3, the backlight unit may further include a diffusion plate, a diffusion film, a focusing film, and a reflective polarizing film, which are stacked on a top surface of the light guide plate 40-B.

As shown in FIG. 3, in the module-type backlight unit, which is a combination type of edge- and direct-types, LEDs are arranged on the entire surface of the printed circuit board 10 and the reflection plate 20, making it difficult to mount the light guide plate.

Thus, the composition according to the present invention is evenly coated on a top surface of the reflection plate 20 to be higher than heights of the LEDs 30, and is hardened, thereby forming the light guide plate 40-B. The light guide plate 40-B may have a thickness in a range of 0.2 to 2 mm. The light guide plate 40-B converts a point light source into a surface light source, and has excellent adhesion while demonstrating reduced curing shrinkage and little change in the color coordinates.

Figure 4:
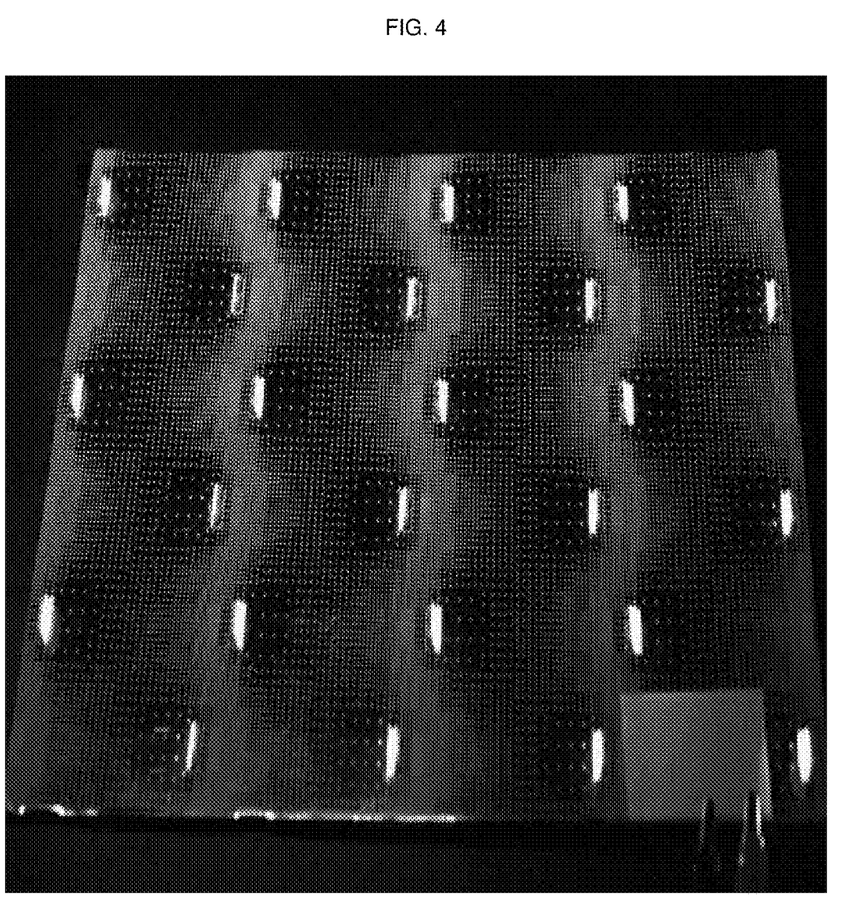
FIG. 4 illustrates emission of light from LEDs in a state in which a composition according to the present invention is not used in forming a light guide plate.
Figure 5:
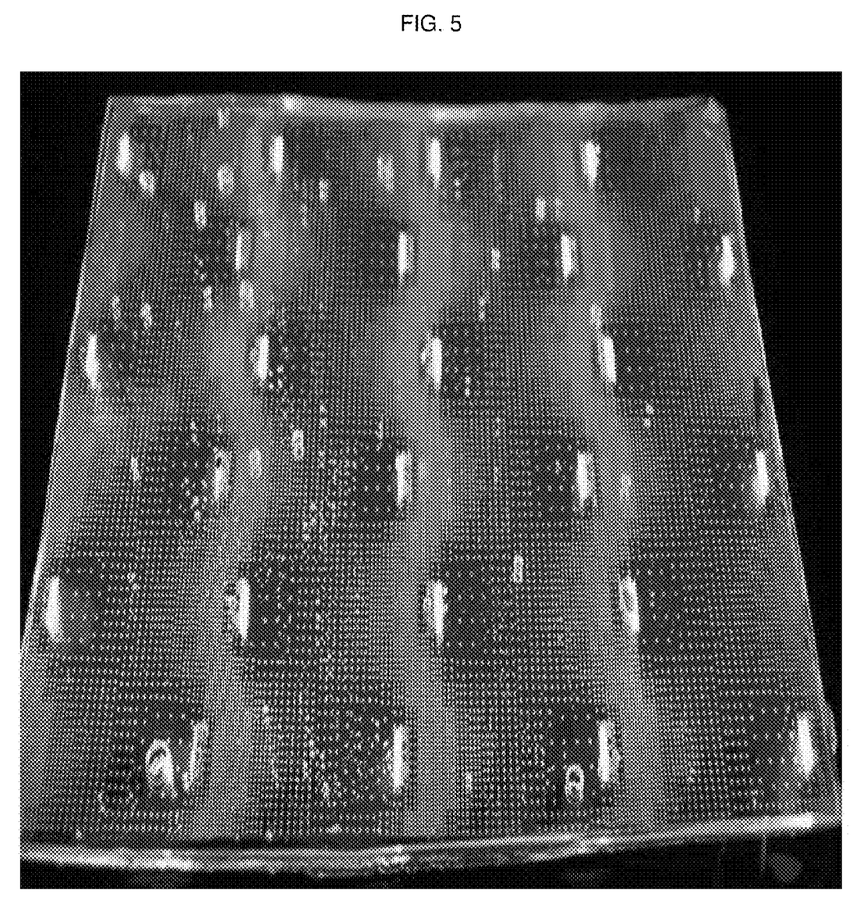
FIG. 5 illustrates emission of light from LEDs in a state in which a composition according to the present invention is used in forming a light guide plate.

FIG. 4 illustrates emission of light from LEDs in a state in which a composition according to the present invention is not used in forming a light guide plate, and FIG. 5 illustrates emission of light from LEDs in a state in which a composition according to the present invention is used in forming a light guide plate.

As shown in FIGS. 4 and 5, the light guide plate formed using the composition according to the present invention serves to convert a point light source into a surface light source.

The present invention also provides a liquid crystal display including the backlight unit.

The liquid crystal display includes a backlight unit including a light guide plate formed using the composition according to the present invention.

The liquid crystal display may take any configuration without restriction, and a configuration that is well known in the related art may be used for the liquid crystal display.

The present invention will be illustrated by the following Examples, which do not limit the scope of the present invention.

Synthesis Example 1

Preparation of Urethane-(Meth)Acrylate Oligomer

To a 2000 ml glass reactor equipped with a stirrer, a heating mantle, a cooling pipe and a thermostat were injected 400 g of polypropyleneglycol having an average molecular weight of 2,000 (Hannong Chemical Inc.; PPG 2000), 111 g of isophorone diisocyanate (Byer; IPDI), and 0.1 g of dibutyl tin dilaurate (Arkema Inc.; Fascat 4202), and the reaction was carried out for 3 hours while maintaining the reactor at a temperature of 70° C. Here, NCO content (%) obtained from wet analysis was 4.9%. The temperature of the reactor was cooled to room temperature. Then, 107.2 g of 2-hydroxyethyl methacrylate (Cognis Corp.; 2-HEMA), 71 g of isoborneol acrylate (Osaka Yuki Kayaku; IBXA), 0.7 g of Sumilizer GP (Sumitomo chemical Co.), 0.8 g of methoxy hydroquinone (Eastman Chemical Co.; HQMME), and 0.2 g of dibutyl tin dilaurate (Arkema Inc.; Fascat 4202) were injected into the reactor, and the reaction was carried out for 6 hours at 75° C. When the isocyanate characteristic peak (2260 $cm^{-1}$) completely disappeared, the reaction was terminated. Here, the measured viscosity of resin was 34,000 cp (25° C.), and the number average molecular weight was 2,700. The maximum shrinkage rate obtained using the Equation (1) was 0.86%.

Synthesis Example 2

Preparation of Urethane-(Meth)Acrylate Oligomer

To a 2000 ml glass reactor equipped with a stirrer, a heating mantle, a cooling pipe and a thermostat were injected 600 g of polytetramethyleneglycol having an average molecular weight of 3,000 (Korea Polyol Co., Ltd.; PTMG 3000), 131 g of hexamethylene diisocyanate (Byer; Desmodur W), and 0.1 g of dibutyl tin dilaurate (Arkema Inc.; Fascat 4202), and the reaction was carried out for 3 hours while maintaining the reactor at a temperature of 70° C. Here, NCO content (%) obtained from wet analysis was 3.5%. The temperature of the reactor was cooled to room temperature. Then, 107.2 g of 2-hydroxyethyl methacrylate (Cognis Corp.; 2-HEMA), 93.3 g of isoborneol acrylate (Osaka Yuki Kayaku; IBXA), 0.7 g of Sumilizer GP (Sumitomo chemical Co.), 0.8 g of methoxy hydroquinone (Eastman Chemical Co.; HQMME), and 0.2 g of dibutyl tin dilaurate (Arkema Inc.; Fascat 4202) were injected into the reactor, and the reaction was carried out for 6 hours at 75° C. When the isocyanate characteristic peak (2260 cm$^{-1}$) completely disappeared, the reaction was terminated. Here, the measured viscosity of resin was 95,000 cp (25° C.), and the number average molecular weight was 3,800. The maximum shrinkage rate obtained using the Equation (1) was 0.28%.

Synthesis Example 3

Preparation of Urethane-(■Meth)Acrylate Oligomer

To a 2000 ml glass reactor equipped with a stirrer, a heating mantle, a cooling pipe and a thermostat were injected 800 g of polyethyleneglycol having an average molecular weight of 4,000 (Hannong Chemical Inc.; PEG 4000(F)), 111 g of isophorone diisocyanate (Byer; IPDI), and 0.1 g of dibutyl tin dilaurate (Arkema Inc.; Fakat 4202), and the reaction was carried out for 3 hours while maintaining the reactor at a temperature of 70° C. Here, NCO content (%) obtained from wet analysis was 2.7%. The temperature of the reactor was cooled to room temperature. Then, 107.2 g of 2-hydroxyethyl methacrylate (Cognis Corp.; 2-HEMA), 115.5 g of isoborneol acrylate (Osaka Yuki Kayaku; IBXA), 0.7 g of Sumilizer GP (Sumitomo chemical Co.), 0.8 g of methoxy hydroquinone (Eastman Chemical Co.; HQMME), and 0.2 g of dibutyl tin dilaurate (Arkema Inc.; Fascat 4202) were injected into the reactor, and the reaction was carried out for 6 hours at 75° C. When the isocyanate characteristic peak (2260 cm$^{-1}$) completely disappeared, the reaction was terminated. Here, the measured viscosity of resin was 125,000 cp (25° C.), and the number average molecular weight was 4,700. The maximum shrinkage rate obtained using the Equation (1) was 0.14%.

Synthesis Example 5

Preparation of Hydrogen Bond Type (Meth)Acrylate

To a 1000 ml glass reactor equipped with a stirrer, a heating mantle, a cooling pipe and a thermostat were injected 450 g of

Synthesis Example 4

Preparation of Hydrogen Bond Type (Meth)Acrylate

To a 2000 ml glass reactor equipped with a stirrer, a heating mantle, a cooling pipe and a thermostat were injected 730 g of 2-hydroxyethyl acrylate (Osaka Yuki Kayaku), 740 g of phthalic anhydride (Aekyung Petrochemical Co.), 10 g of triethylamine (Daejung Chemical Co.), and 1 g of methoxy-hydroquinone (Eastman Chemical Co.; HQMME), and stirred. Then, the reaction temperature was raised to 80° C. and caused the reaction to take place for 3 hours. When all solid raw materials became liquid phases, the temperature was naturally cooled to room temperature and the reaction was carried out for 20 hours. When the acid anhydride characteristic peaks (two peaks around 1760 cm$^{-1}$), as observed by FT-IR spectroscopy, completely disappeared, the reaction was terminated. Here, the acid value was 190 mg KOH/g, the viscosity of resin was 11,000 cp (25° C.), and the maximum shrinkage rate obtained using the Equation (1) was 8.8%.

phenol glycidyl ether (Sakai Chemical Ind.; PGE, 99%), 216 g of acrylic acid (LG Chemical; AA), 0.6 g of triphenylphosphine (Junsei Chemical Co.; TPP), and 0.4 g of methoxy hydroquinone (Eastman Chemical Co.)), and the reaction was carried out for 6 hours while maintaining the reactor at a temperature of 90° C. When the acid value became less than 1 mg KOH/g, the reaction was terminated. Here, the viscosity of resin was 200 cp, the molecular weight was 222, and the maximum shrinkage rate obtained using the Equation (1) was 11%.

-continued

Examples 1-6 and Comparative Examples 1-4

Preparation of Resin-Type Light Guide Plate Composition

Resin-type light guide plate compositions were prepared using resins prepared in the synthesis examples using compositional contents listed below in Table 1 by the method that is well known in the art.

TABLE 1

| Composition | Example | | | | | | Comparative Example | | | |
| --- | --- | --- | --- | --- | --- | --- | --- | --- | --- | --- |
|  | 1 | 2 | 3 | 4 | 5 | 6 | 1 | 2 | 3 | 4 |
| Synthesis Example 1 | 50 | — | — | 60 | — | 60 | — | 20 | 20 | — |
| Synthesis Example 2 | — | 40 | — | — | — | — | — | — | — | — |
| Synthesis Example 3 | — | — | 30 | — | 25 | — | — | — | — | — |
| EB-4883[1] | — | — | — | — | — | — | 50 | — | 30 | 50 |
| Synthesis Example 4 | 15 | 5 | 10 | — | 35 | 15 | — | 40 | — | — |
| Synthesis Example 5 | — | 20 | — | 20 | — | — | 20 | 10 | 5 | — |
| 2-HEMA[2] | 9 | 9 | 17 | — | 4 | 9 | 9 | 4 | — | 15 |
| NPEA[3] | 25 | 24 | 40 | 19 | 35 | — | 9 | 5 | 14 | — |
| 2-PEA[4] | — | — | — | — | — | 25 | — | — | — | — |
| TPGDA[5] | — | — | — | — | — | — | 10 | 20 | 30 | 24 |
| TMPTA[6] | — | 1 | 2 | — | — | — | 1 | — | — | 10 |
| D-TPO[7] | 0.8 | 0.8 | 0.8 | 0.8 | 0.8 | 0.8 | 0.8 | 0.8 | 0.8 | 0.8 |
| Iganox 1010[8] | 0.2 | 0.2 | 0.2 | 0.2 | 0.2 | 0.2 | 0.2 | 0.2 | 0.2 | 0.2 |
| Maximum Shrinkage Rate(%) | 4.7 | 5.9 | 6.7 | 3.5 | 5.4 | 6.9 | 8.1 | 9.3 | 7.4 | 11.7 |

[1] EB-4883: Bi-functional urethane acrylate oligomer having a molecular weight of 1800 (TPGDA 15% diluted); 3.2% shrinkage rate
[2] 2-HEMA: 2-hydroxyethylmethacrylate (Cognis), 20.5% shrinkage rate
[3] NPEA: Nonylpheone ethylene oxide (4 mol) acrylate (Hannong Chemical; NP-041), 4.1% shrinkage rate
[4] 2-PEA: 2-phenoxyethyl acrylate, 13% shrinkage rate
[5] TPGDA: Tripropylene glycol diacrylate (Miwon Commercial Co.; M200), 17% shrinkage rate
[6] TMPTA: Trimethylpropanol triacrylate (Miwon Commercial Co.; M300), 28% shrinkage rate
[7] D-TPO: 2,4,6-Trimethylbenzoyl-diphenyl-phosphineoxide (Ciba Geigy)
[8] Iganox 1010: Phenol-based thermal stabilizer (Ciba Geigy)

Experimental Example 1

Measurement of Adhesion

Compositions prepared in examples and comparative examples were table coated on a structure shown in FIG. 4 to a thickness of 1.5 mm, primarily hardened by a black light lamp with intensity of 350 mJ/cm² under a nitrogen atmosphere, and secondarily hardened by a metal hydride lamp with intensity of 1 J/cm², thereby fabricating test specimens. The fabricated test specimens were subjected to T tests using UTM manufactured by Instron Corp. The adhesion was measured at a rate of 2 mm/min. Adhesion between glass and metal was evaluated using the average of the measured adhesion values with the maximum and minimum values excluded, and the evaluation results are shown in Table 2.

Experimental Example 2

Observation of Changes in Color Coordinates

The test specimen fabricated in the same manner as described in Experimental Example 1 was separated from a base film to then be adhered to a glass panel. Color values of the glass panel and the test specimen were measured using a spectrocolorimeter SE200 manufactured by Nippon Denshoku Ind. in a transmission mode to obtain $\Delta E^*ab$. The results are shown in Table 2.

Experimental Example 3

Measurement of Hardening Degrees and Shrinkage Rates

Approximately 1 g of a resin portion was taken from the test specimen fabricated in such a manner as described in Experimental Example 1 and accurately weighed to obtain the weight (Wo) of the test specimen. Then, the resultant test specimen was allowed to stand in 10 g of an ethyl acetate solution for 24 hours, and then dried in an oven maintained at 60° C. for 4 hours. Thereafter, the weight (Wi) of the test specimen was measured. The curing degree was calculated using the equation (3) and the actual shrinkage rate was calculated using the equation (4):

$$\text{Curing degree (\%)} = (Wi/Wo) \times 100 \qquad \text{<Equation 3>}$$

$$\text{Actual shrinkage rate (\%)} = \{\text{Curing degree (\%)} \times \text{maximum shrinkage rate (\%) by Equation (2)}\}/100 \qquad \text{<Equation 4>}$$

Experimental Example 4

Measurement of Light Fastness

The test specimen fabricated in the same manner as described in Experimental Example 1 was placed in a CT-UVT equipment (UV-B, 280-360 nm) manufactured by Coretech, Korea for 100 hours. Then, an initial color value was measured using a spectrocolorimeter SE200 manufactured by Nippon Denshoku Ind. in a transmission mode and a color value after the test light fastness test was measured, thereby calculating ΔE*ab. The results are shown in Table 2.

$$\Delta E^*ab = \{(\Delta L^*)2 + (\Delta a^*)2 + (\Delta b^*)2\}^{1/2}$$

Experimental Example 5

Evaluation of High Temperature and High Humidity

Test specimens were fabricated in the same manner as the specimens fabricated to measure elongation rates of compositions prepared in examples and comparative examples. The fabricated test specimens were placed in a temperature & humidity chamber (60° C., 95% humidity) and allowed to stand for 500 hours, followed by measuring color values. Differences between the initial color value and the color values measured after the test specimens were allowed to stand in the chamber were represented as ΔE*ab values. The results are shown in Table 2.

TABLE 2

| | Example | | | | | | Comparative Example | | | |
|---|---|---|---|---|---|---|---|---|---|---|
| | 1 | 2 | 3 | 4 | 5 | 6 | 1 | 2 | 3 | 4 |
| Adhesion (N) | 32 | 41 | 26 | 29 | 44 | 24 | 12 | 19 | 9 | 3 |
| Initial Color Value | 0.3 | 0.4 | 0.4 | 0.5 | 0.3 | 0.5 | 1.2 | 1.5 | 1.2 | 1.9 |
| Hardness (%) | 94 | 95 | 90 | 96 | 93 | 89 | 80 | 66 | 81 | 85 |
| Shrinkage Rate (%) | 4.4 | 5.6 | 6.0 | 3.4 | 5.0 | 6.1 | 6.5 | 6.2 | 6.0 | 9.9 |
| Light Fastness | 4.2 | 5.1 | 4.4 | 5.2 | 3.7 | 5.8 | 11.5 | 12.7 | 11.2 | 15.7 |
| High-temp. high-humidity | 1.5 | 1.8 | 1.3 | 2.8 | 2.5 | 2.8 | 9.1 | 8.7 | 9.8 | 10.8 |

As confirmed from Table 2, when a light guide plate was fabricated using the resin-type light guide plate composition, the excellent adhesion and reduced shrinkage rate were demonstrated. In addition, even after the fabricated light guide plate was allowed to stand under a UV or high-temperature and high-humidity condition, the color values showed little difference.

While this invention has been described in connection with what is presently considered to be practical exemplary embodiments, it is to be understood that the invention is not limited to the disclosed embodiments, but, rather is intended to cover various modifications and equivalent arrangements included within the spirit and scope of the appended claims.

What is claimed is:

1. A resin-type light guide plate composition comprising:
urethane-(meth)acrylate oligomer prepared by reacting a reaction product of a compound prepared by reacting divalent polyol and divalent isocyanate with (meth)acrylate monomer including hydroxyl group, as represented by the formula (1);

<Formula 1> wherein $R_1$ represents a structure excluding a terminal hydroxyl group from divalent polyol, $R_2$ represents a structure excluding a terminal isocyanate group from the divalent isocyanate, $R_3$ represents n is an integer of 1 to 10, and $R_4$ represents hydrogen or methyl;

hydrogen bond type (meth)acrylate including hydroxyl group or carboxyl group;

acrylic monomer having a maximum shrinkage rate of 15% or less, represented by the equation (1):

Maximum shrinkage rate (%)=−2.58+3000*[number of (meth)acryl functional groups/molecular weight of acrylic monomer]; and <Equation 1> a photoinitiator.

2. The composition of claim 1, wherein the urethane-(meth)acrylate oligomer has a number average molecular weight ranging from 2,000 to 5,000.

3. The composition of claim 1, wherein the hydrogen bond type (meth)acrylate is represented by the formula 2 or 3:

<Formula 2>

<Formula 3> wherein $R_1$ independently represents alkyl or heteroalkyl having 1 to 10 carbon atoms, cycloalkyl having 3 to 8 carbon atoms, phenyl, alkylphenyl having 1 to 10 carbon atoms, or phosphorus, $R_2$ represents hydroxyl or carboxyl, and $R_3$ represents hydrogen or methyl.

4. The composition of claim 1, wherein the hydrogen bond type (meth)acrylate is acid-denatured (meth)acrylate oligomer prepared by reacting acid anhydride with (meth)acrylate monomer containing hydroxyl group.

5. The composition of claim 4, wherein the acid-denatured (meth)acrylate oligomer is represented by the formula 4:

<Formula 4> wherein $R_1$ independently represents hydrogen or methyl; $R_2$ independently represents or n is an integer of 1 to 10;
$R_3$ independently represents a radical selected from the group consisting of hydrogen, saturated or unsaturated alkyl having 1 to 10 carbon atoms, heteroalkyl, benzyl, carboxyl group, hydroxyl group, and halogen atom; and
$R_4$ independently represents a radical selected from the group consisting of saturated or unsaturated alkyl having 1 to 10 carbon atoms.

6. The composition of claim 1, wherein the urethane-(meth)acrylate oligomer is contained in the composition in an amount of 10 to 70 wt % based on the total weight of the composition.

7. The composition of claim 1, wherein the hydrogen bond type (meth)acrylate is contained in the composition in an amount of 10 to 40 wt % based on the total weight of the composition.

8. The composition of claim 1, wherein the acrylic monomer is contained in an amount of 10 to 60 wt % based on the total weight of the composition.

9. The composition of claim 1, wherein the resin-type light guide plate composition further comprises a tri- or higher-functional (meth)acrylate hardener having a maximum shrinkage rate of 20% or higher, represented by the equation (1).

10. The composition of claim 1, wherein two or more kinds of the acrylic monomer are contained in the composition and the maximum shrinkage rate calculated by the equation (2) is in a range of 3 to 7%:

Maximum shrinkage rate (%)=$\Sigma_{n=1}^{i} XnSn$ <Equation 2> wherein i is the number of kinds of the acrylic monomer contained in the composition, assuming that each acrylic monomer is referred to as an nth monomer irrespective of the order thereof contained in the composition, XnSn means the product of Xn and Sn, wherein Xn denotes a mass fraction of the nth monomer, and Sn is a maximum shrinkage rate of the nth monomer, which is calculated by the equation (1).

11. The composition of claim 1, further comprising an UV stabilizer or a thermal stabilizer.

12. The composition of claim 1, wherein the divalent polyol is selected, alone or in combination, from the group consisting of polyester polyol, polycaprolactone denatured polyol, polycarbonate polyol, polybutadiene polyol, polyisophorene polyol, polyethyleneglycol, polypropyleneglycol, polyethylene-propyleneglycol and polytetramethylglycol.

13. The composition of claim 1, wherein the divalent isocyanate is selected from the group consisting of toluene-2,4-diisocyanate and isomers, xylene diisocyanate, isophorone diisocyanate, tetramethylxylene diisocyanate, lysine diisocyanate, trimethylhexamethylene diisocyanate, 2,2-bis-isocyanatopropane, 6-isopropyl-1,3-phenyldiisocyanate, bis(2-isocyanateethyl)-fumarate, 1,6-hexanediisocyanate, 4,4'-biphenylene diisocyanate, 3,3'-dimethylphenylene diisocyanate, 3,3'-dimethyl-4,4'-diphenylmethane diisocyanate, p-phenylene diisocyanate, m-phenylene diisocyanate, 1,5-naphthalene diisocyanate, 1,4-xylene diisocyanate, 1,3-xylene diisocyanate and 4,4-dicyclohexylmethane diisocyanate, alone or in combination.

14. A backlight unit comprising:
a light emitting diode; and
a light guide plate formed on a reflection plate using the composition of claim 1 to cover the light emitting diode.

15. The backlight unit of claim 14, wherein the light guide plate has a thickness of 0.2 to 2 mm.

16. A liquid crystal display including the backlight unit of claim 14.

* * * * *